(12) United States Patent
Miller et al.

(10) Patent No.: US 9,274,018 B2
(45) Date of Patent: Mar. 1, 2016

(54) REMOTE SEAL PROCESS PRESSURE MEASURING SYSTEM

(71) Applicant: Rosemount Inc., Chanhassen, MN (US)

(72) Inventors: Brent Wayne Miller, Minnetonka, MN (US); Paul Ryan Fadell, Spring Park, MN (US)

(73) Assignee: Rosemount Inc., Chanhassen, MN (US)

( * ) Notice: Subject to any disclaimer, the term of this patent is extended or adjusted under 35 U.S.C. 154(b) by 368 days.

(21) Appl. No.: 13/630,998

(22) Filed: Sep. 28, 2012

(65) Prior Publication Data
US 2014/0090476 A1    Apr. 3, 2014

(51) Int. Cl.
*G01L 7/00* (2006.01)
*G01L 19/06* (2006.01)
*G01L 19/00* (2006.01)
(Continued)

(52) U.S. Cl.
CPC ......... *G01L 19/0618* (2013.01); *G01L 19/0046* (2013.01); *G01L 19/0681* (2013.01); *G01L 27/007* (2013.01); *G01L 13/026* (2013.01)

(58) Field of Classification Search
CPC ......... G01L 19/06; G01L 19/00; G01L 27/00; G01L 19/0645; G01L 19/0038; G01L 19/0007; G01L 7/00; G01L 19/04
USPC ..................... 73/706, 700; 702/185
See application file for complete search history.

(56) References Cited

U.S. PATENT DOCUMENTS

| 3,956,937 A | * | 5/1976 | Lawford | G01F 1/38 |
| | | | | 73/706 |
| 3,986,399 A | | 10/1976 | Satou et al. | |
| 4,279,160 A | * | 7/1981 | Fukada | G01L 19/0681 |
| | | | | 73/706 |

(Continued)

FOREIGN PATENT DOCUMENTS

| EP | 0 504 772 | 9/1992 |
| EP | 1 602 907 | 7/2005 |
| WO | WO 98/41834 | 9/1998 |

OTHER PUBLICATIONS

Notification of Transmittal of the International Search Report and Written Opinion of the International Searching Authority, from PCT/US2013/060538, dated Jul. 29, 2014.

(Continued)

*Primary Examiner* — Lisa Caputo
*Assistant Examiner* — Nigel Plumb
(74) *Attorney, Agent, or Firm* — Westman, Champlin & Koehler, P.A.

(57) ABSTRACT

A process pressure measuring system includes a transmitter having a first sealed system in which a first outlet couples to a pressure sensor, a first isolator diaphragm assembly, a first capillary passage, and a first isolation fluid. The first isolation fluid couples a first pressure from the first isolator diaphragm to the first outlet and the pressure sensor. A second sealed system includes a second pressure outlet that is coupled to the first isolator diaphragm assembly, a second isolator diaphragm assembly, a second capillary passage and a second isolation fluid. The second isolation fluid is adapted for use in a first temperature range and couples a pressure from the second isolator diaphragm assembly to the second pressure outlet. A third sealed system includes a third pressure outlet that is coupled to the second isolator diaphragm assembly, a third isolator diaphragm assembly, a third capillary passage and a third isolation fluid. The third isolator fluid is adapted for use in a second temperature range and couples a process pressure to the third pressure outlet.

24 Claims, 11 Drawing Sheets

(51) Int. Cl.
*G01L 27/00* (2006.01)
*G01L 13/02* (2006.01)

(56) References Cited

U.S. PATENT DOCUMENTS

| | | | |
|---|---|---|---|
| 4,722,228 | A | 2/1988 | Awa et al. |
| 5,811,690 | A * | 9/1998 | Hershey ................ G01P 1/006 73/299 |
| 6,038,961 | A | 3/2000 | Filippi et al. |
| 6,120,033 | A | 9/2000 | Filippi et al. |
| 7,258,017 | B1 | 8/2007 | Hedtke |
| 8,244,858 | B2 * | 8/2012 | Firminger ................ G06N 5/04 702/183 |
| 8,720,277 | B2 | 5/2014 | Norberg et al. |
| 2005/0126296 | A1 | 6/2005 | Hedtke |
| 2005/0225035 | A1 | 10/2005 | Sundet |
| 2005/0284227 | A1 | 12/2005 | Broden et al. |
| 2006/0162458 | A1 | 7/2006 | Broden |
| 2006/0162459 | A1 | 7/2006 | Broden |
| 2007/0220985 | A1 | 9/2007 | Hedtke |
| 2007/0234813 | A1 | 10/2007 | Hedtke |
| 2007/0234825 | A1 * | 10/2007 | Loomis ................ G01L 1/205 73/862 |
| 2007/0251317 | A1 | 11/2007 | Lopushansky et al. |
| 2007/0272027 | A1 | 11/2007 | Hedtke |
| 2009/0308170 | A1 * | 12/2009 | Broden ............... G01L 19/0645 73/723 |
| 2011/0232369 | A1 * | 9/2011 | Tabaru .................... G01N 3/32 73/37 |
| 2011/0308299 | A1 * | 12/2011 | Tabaru ................ G01L 27/007 73/37 |

OTHER PUBLICATIONS

Invitation to Pay Additional Fees and, Where Applicable, Protest Fee dated Feb. 5, 2014 for International Application No. PCT/US2013/060538, filed Sep. 19, 2013.
Communication from European Patent Application No. 13767243.2, dated Apr. 2, 2015.
Office Action from Chinese Patent Application No. 20122065641.4, dated Mar. 22, 2013.
Office Action from Chinese Patent Application No. 201210510267.6, dated Mar. 23, 2015.

* cited by examiner

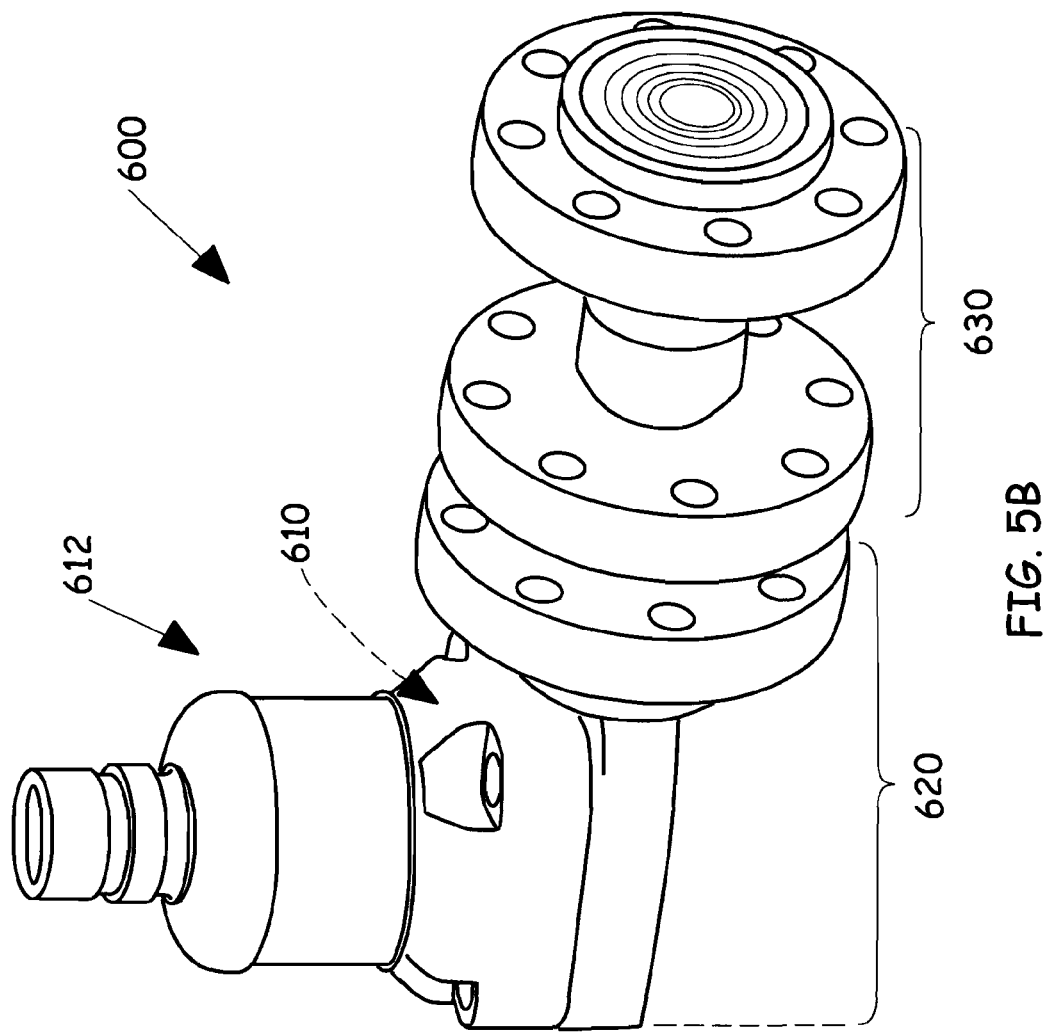

REMOTE SEAL PROCESS PRESSURE MEASURING SYSTEM

BACKGROUND OF THE INVENTION

The present invention relates to remote seal systems for use with industrial process pressure transmitters. More specifically, the present invention relates to such remote seal systems used in extreme temperature environments.

Industrial process control systems are used to monitor and control industrial processes used to produce or transfer fluids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a pressure transmitter which measures pressure of a process fluid and provides an output related to the measured pressure. This output may be a pressure, a flow rate, a level of a process fluid, or other process variable. The transmitter is configured to transmit information related to the measured pressure back to a central control room. The transmission is typically over a two wire process control loop, however, other communication techniques may be used, including wireless techniques.

The pressure must be coupled to a process variable transmitter through some type of a process coupling. For example, the process fluid can comprise a component used in an industrial process such as natural gas, oil, etc. In certain process pressure measurement applications, the pressure transmitter is located remotely relative to a pressurized process fluid, and pressure is physically conveyed from the process fluid to the pressure transmitter through a fluid link using a device called a remote seal.

In specific applications where great temperature differences between ambient and process temperatures are encountered in the environment surrounding the remote seals, the remote seals may perform poorly (or are not configurable at all for these applications) and this leads to potential inaccuracies in the measured pressure and other problems. There is a need to improve remote seals to better withstand great temperature differences.

SUMMARY OF THE INVENTION

A process pressure measuring system includes a transmitter having a first sealed system in which a first outlet couples to a pressure sensor, a first isolator diaphragm assembly, a first capillary passage, and a first isolation fluid. The first isolation fluid couples a first pressure from the first isolator diaphragm to the first outlet and the pressure sensor. A second sealed system includes a second pressure outlet that is coupled to the first isolator diaphragm assembly, a second isolator diaphragm assembly, a second capillary passage and a second isolation fluid. The second isolation fluid is adapted for use in a first temperature range and couples a pressure from the second isolator diaphragm assembly to the second pressure outlet. A third sealed system includes a third pressure outlet that is coupled to the second isolator diaphragm assembly, a third isolator diaphragm assembly, a third capillary passage and a third isolation fluid. The third isolator fluid is adapted for use in a second temperature range and couples a process pressure to the third pressure outlet.

BRIEF DESCRIPTION OF THE DRAWINGS

FIGS. 5A-5B illustrate oblique views of a second embodiment of a process pressure measuring system.

DETAILED DESCRIPTION

There is a potential problem when a remote seal's isolator diaphragm is in contact with a process fluid at high temperatures while, at the same time, the remote seal's capillary tube passes through a lower temperature region. If an isolation fluid that is suitable for use at higher temperatures is selected for use in the remote seal, such a high temperature rated isolation fluid may become viscous at lower temperatures, causing an unacceptable time delay in transmission through the capillary tube of rapid pressure changes. On the other hand, if an isolation fluid is selected that is free flowing (low viscosity) and suitable for use in capillary passages at lower temperatures, such a low temperature isolation fluid may vaporize or degrade at higher temperatures.

A "heat trace" can be used to warm the remote seal's capillary tube to a desired temperature. The use of a heat trace is expensive, requires additional control circuitry, and may fail. There is also a risk that thermal expansion of the isolation fluid due to heat tracing will expand the isolator diaphragm excessively, damaging the isolator diaphragm. Further, such a system is difficult to repair and install.

As described below in connection with FIGS. 1-8, a process pressure measuring system in which first, second and third sealed systems with at least one different type of isolation fluid with a different temperature characteristic is provided. The first, second and third sealed systems are arranged in a three stage tandem pressure conveying arrangement, and provide a solution to these problems.

Figure 1:
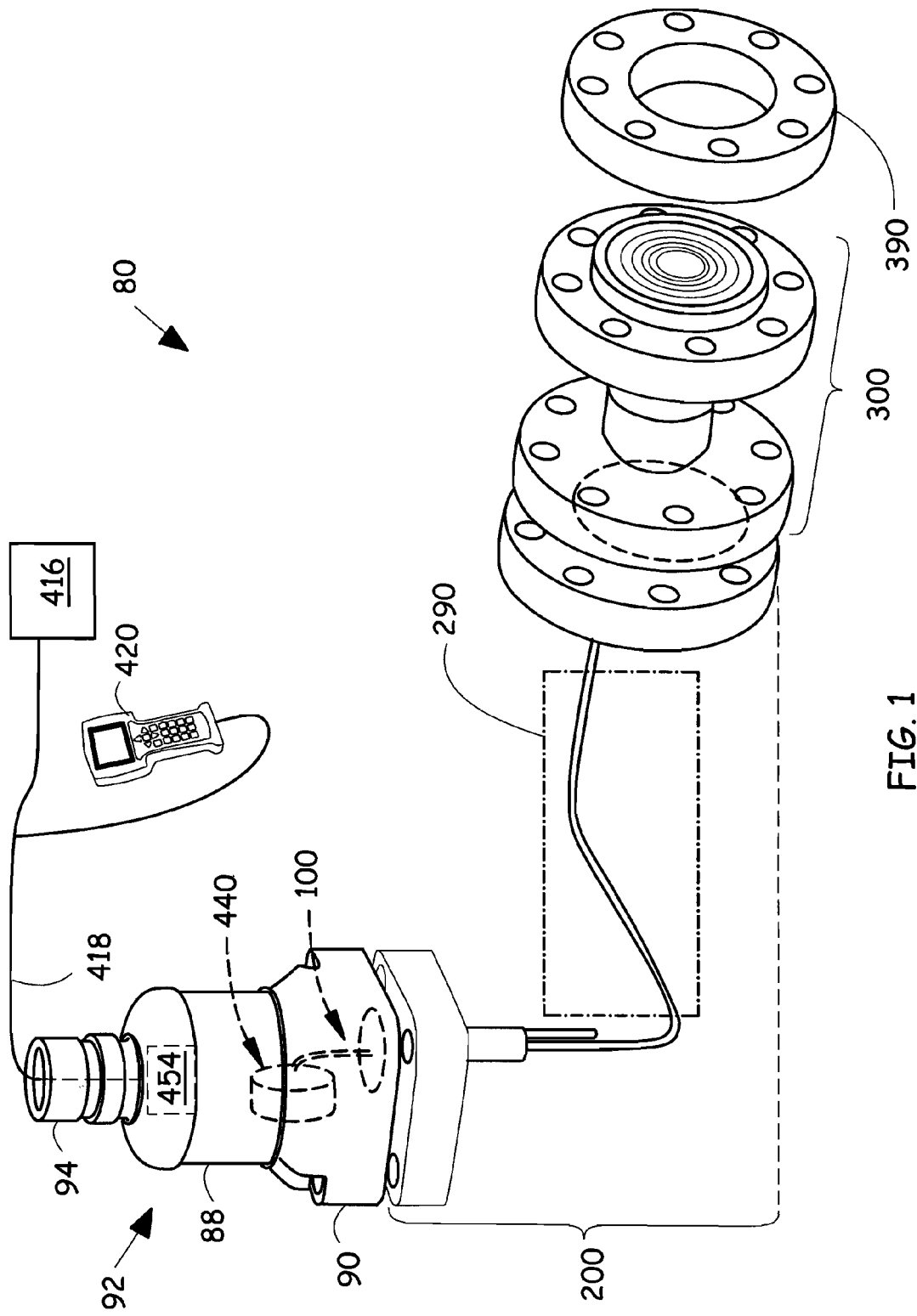
FIG. 1 illustrates an exploded view of a first embodiment of a process pressure measuring system.

FIG. 1 illustrates an exploded view of a process pressure measuring system 80 that is useful in an industrial process plant where high and/or low temperature extremes are present. The process pressure measuring system 80 measures a pressure that is present at an industrial process vessel flange 390 that is heated (or cooled) to an extreme temperature relative to an environment 290 which may experience temperatures in a first temperature range. The process pressure measuring system 80 comprises a first sealed system 100, a second sealed system 200, and a third sealed system 300. The sealed systems 100, 200, 300 are coupled together in a three stage cascade (also called a three stage tandem) pressure conveying arrangement as illustrated in FIG. 1. The vessel flange 390, which connects to the third sealed system 300, is in a second temperature range, for example, heated to over 300 degrees Centigrade. The second sealed system 200 passes through the environment 290 in the first temperature range, for example, in which temperatures fall below 0 degrees Centigrade. The first sealed system 100 is disposed in an industrial pressure transmitter 92.

Each of the sealed systems 100, 200, 300 contains a type of isolation fluid (not illustrated in FIG. 1) that is selected based on temperature characteristics. Capillary passages (not illustrated in FIG. 1) are used in the sealed systems 100, 200, 300, and capillary passage sizes are selected for each sealed system in view of temperature, capillary length, and thermal expansion and viscosity characteristics of the selected isolation fluid. Isolation fluids have limited operating temperature ranges, and different types of isolation fluids with different temperature ranges are selected to fill sealed systems 200 and 300 as described in more detail below in FIGS. 2-8.

The sealed system 100 conveys pressure to a pressure sensor 440 in a lower module 90 of the industrial pressure transmitter 92. The industrial pressure transmitter 92 includes electronic circuitry 454 in an upper housing 88 that connects through electrical connector 94 to provide an output indicating pressure on line 418. Line 418 couples to an industrial control system 416 which energizes the transmitter 92. In one embodiment, a hand held field calibrator 420 (also called field maintenance tool 420) is temporarily coupled to the line 418 in order to diagnose, test, program and provide compensation data to the industrial pressure transmitter 92. In one embodiment, a technician can use the calibrator 420 to enter data into the industrial measurement transmitter 92 which compensates for potential inaccuracies introduced by the use of sealed systems 200, 300. The pressure transmitter 92 is described in more detail below in connection with FIGS. 3-4.

Figure 2A:
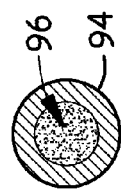
FIG. 2A illustrates an exemplary capillary passage filled with an isolator fluid.

FIG. 2A is a cross-sectional view of an exemplary capillary passage 94. The capillary passage 94 is filled with isolation fluid 96. Capillary passages, such as shown in the example in FIG. 2A, are used in sealed systems 100, 200, 300. The isolation fluid can be one of several types, depending on whether it is used in system 100, 200 or 300, which are at different temperatures. Capillary passages include capillary tubes as well as drilled capillary passages through blocks of solid material such as metal. According to one aspect, the isolation fluid used in sealed system 200 comprises a low viscosity fill fluid that flows freely with a predictable fast time response at low temperatures, for example, below 0 degree Centigrade. Such low viscosity, free flowing fill fluids include silicone 200, white mineral oil and any suitable incompressible fluid with a viscosity of less than 10 centistokes at 25 degrees Centigrade. The use of low viscosity, free flowing fill fluids avoids a need for heat tracing of the sealed system 200. According to another aspect, the isolation fluid used in sealed system 300 comprises a high temperature fill fluid which does not vaporize or deteriorate at high process temperatures, for example, in the range of 350 degrees Centigrade and above, and at pressures within the pressure range of the process fluid. Such high temperature fill fluids include silicone 704, silicone 705, liquid metal, molten salt and vacuum pump oil. According to one embodiment, capillary passages used in sealed systems 200, 300 have inside diameters in the range of 0.028 inches to 0.075 inches. Lengths of capillary passages are preferably only as long as needed to make connections, and are preferably in the range of 1 to 30 feet in length.

Figure 2B:
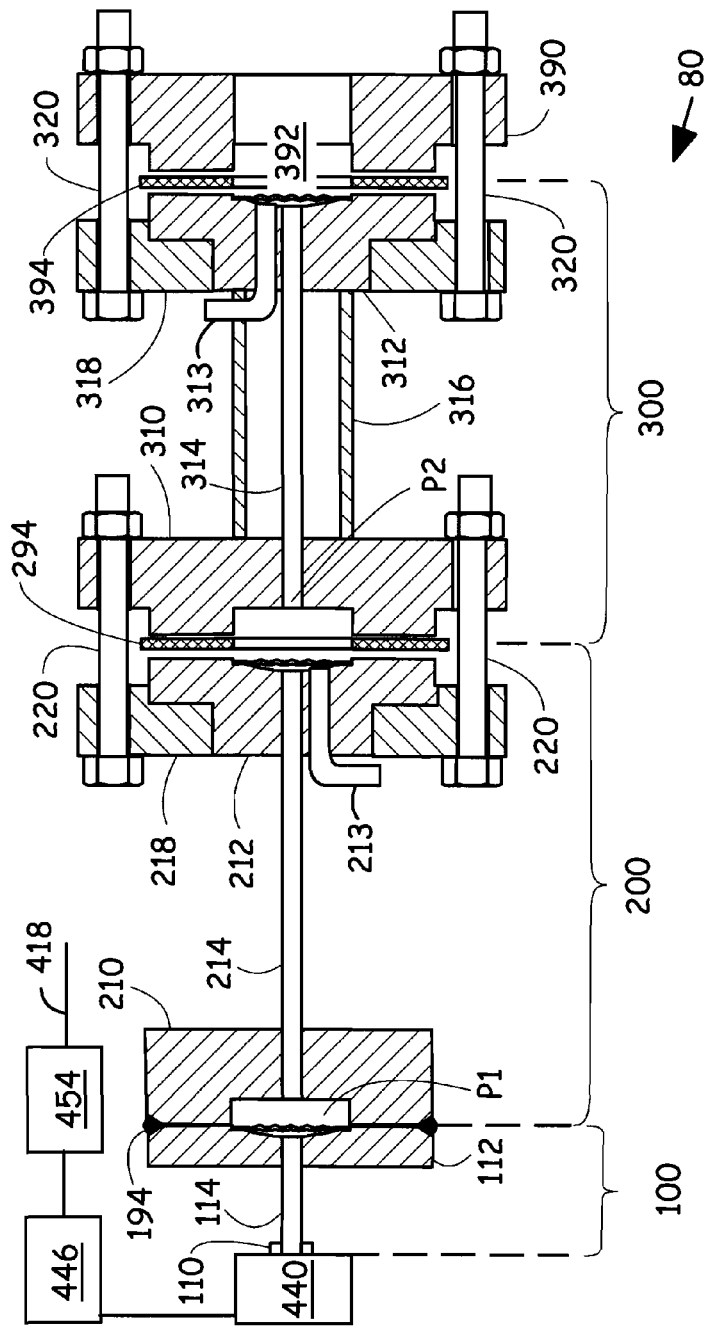
FIG. 2B illustrates a schematic cross section of a process pressure measuring system.

FIG. 2B illustrates a schematic cross section of the process pressure measuring system 80 illustrated in FIG. 1. First sealed system 100 includes a first pressure outlet 110 that connect to the pressure sensor 440. The first sealed system 100 comprises a first isolator diaphragm assembly 112 and a first capillary passage 114 filled with isolation fluid (as described in FIG. 2A) that couples a first pressure P1 from the first isolator diaphragm assembly 112 through the first pressure outlet 110 to the pressure sensor 440. The first pressure P1 differs from a pressure sensed by the pressure sensor 440 by a small first pressure loss needed to cause deflection in the first diaphragm assembly 112. In one embodiment, inaccuracy due to this small first pressure loss is compensated at the transmitter output on line 418 (FIG. 1) by factory calibration of the pressure transmitter 92 (FIG. 1).

According to this embodiment, second sealed system 200 includes a second pressure outlet 210, a second isolator diaphragm assembly 212 and a second capillary passageway 214 filled with a low temperature isolation fluid (as described in FIG. 2A) that couples a second pressure P2 from the second isolator diaphragm assembly 212 through the second pressure outlet 210 to the first isolator diaphragm assembly 112. The second pressure outlet 210 is open (not closed off by an isolator diaphragm) so that it can couple pressure to the first isolator diaphragm assembly 112. The second isolator diaphragm assembly 212 includes a fill tube 213 that is crimped after filling. The first pressure P1 differs statically from the second pressure P2 by a second small pressure loss (static error) needed to cause deflection in the isolator diaphragm assembly 212. The first pressure P1 also differs dynamically from the second pressure P2 by a second small dynamic pressure loss (dynamic error) needed to overcome viscosity of low temperature isolation fluid in the second sealed system 200 at temperatures below 0 degrees Centigrade. The small dynamic pressure loss is controllable by selection of the low temperature isolation fluid and selection of the size of capillary passages in the second isolator system 200. According to one embodiment, static error due to this small second pressure loss is compensated at the transmitter output on line 418 (FIG. 1) by field downloading of compensation data into the pressure transmitter 92 (FIG. 1) using the handheld calibrator 420 (FIG. 1).

Third sealed system 300 includes a third pressure outlet 310, a third isolator diaphragm assembly 312, couplable to a high temperature source (flange 390) of a process pressure 392, and a third capillary passage 314 filled with a high temperature isolator fluid (as described in FIG. 2A) that couples the process pressure 392 from the third isolator diaphragm assembly 312 through the third pressure outlet 310 to the second isolator diaphragm assembly 212. The third pressure outlet 310 is open (not closed off by an isolator diaphragm) so that it can couple pressure to the second isolator diaphragm assembly 212. The third isolator diaphragm assembly 312 includes a fill tube 313 that is crimped and welded after filling. The second pressure P2 differs statically from the process pressure 392 by a third small pressure loss needed to cause deflection in the third isolator diaphragm assembly 312. According to one embodiment, inaccuracy due to this small third pressure loss is compensated at the transmitter output on line 418 (FIG. 1) by the field downloading of compensation data into the pressure transmitter 92 (FIG. 1) using the handheld calibrator 420.

The third sealed system preferably includes a support tube 316 that extends between the third pressure outlet 310 and the third isolator diaphragm assembly 312. According to one embodiment, the support tube 316 is welded to the third pressure outlet 310 and the third isolator diaphragm assembly 312, and provides mechanical support and protection for the third capillary passage 314.

According to one embodiment, the second and third sealed systems 200, 300, taken together, comprise a dual temperature remote seal system. This can be useful for coupling a pressure transmitter (such as transmitter 92 in FIG. 1) to a hot process flange (such as hot process flange 390 in FIG. 1) at a temperature over 300 degrees Centigrade, while at the same time, the capillary passage 214 passes through an environment (such as environment 290 in FIG. 1) that is below 0 degrees Centigrade. The dual temperature remote seal system can also be used to couple to a cold process flange.

According to one embodiment, the process pressure measuring system 80 comprises a rotatable flange 218 that comprises a peripheral pattern of mounting holes for mounting bolts 220. The rotatable flange 218 rotatably engages the second isolator diaphragm assembly 212. The rotatable flange 218 is rotatable to align the mounting bolt holes with a corresponding pattern of bolt holes on the non-rotatable third pressure outlet 310 for removable attachment to the third sealed system 300. The use of bolts for assembly permits either sealed system 200, 300 to be removed in a field environment, and replaced or repaired independently.

According to another embodiment, the process pressure measuring system 80 comprises a rotatable flange 318 that comprises a peripheral pattern of mounting holes for mounting bolts 320. The rotatable flange 318 rotatably engages the third isolator diaphragm assembly 312. The flange 318 is rotatable to align the mounting bolt holes with a corresponding pattern of bolt holes on the non-rotatable process vessel flange 390 for removable attachment to a source of high temperature process fluid pressure.

A compressed gasket 394 is used to provide sealing between the process flange 390 and the third isolator assembly 312. A compressed gasket 294 is used to provide sealing between the third inlet 310 and the second isolator assembly 212. A weld 194 is used to seal the second inlet 210 to the first isolator assembly 112. Other known types of seals are also contemplated.

It is understood that the temperatures mentioned are exemplary temperatures, and that installations are also contemplated in which a process fluid is cold and an installation environment is hot.

Figure 3:
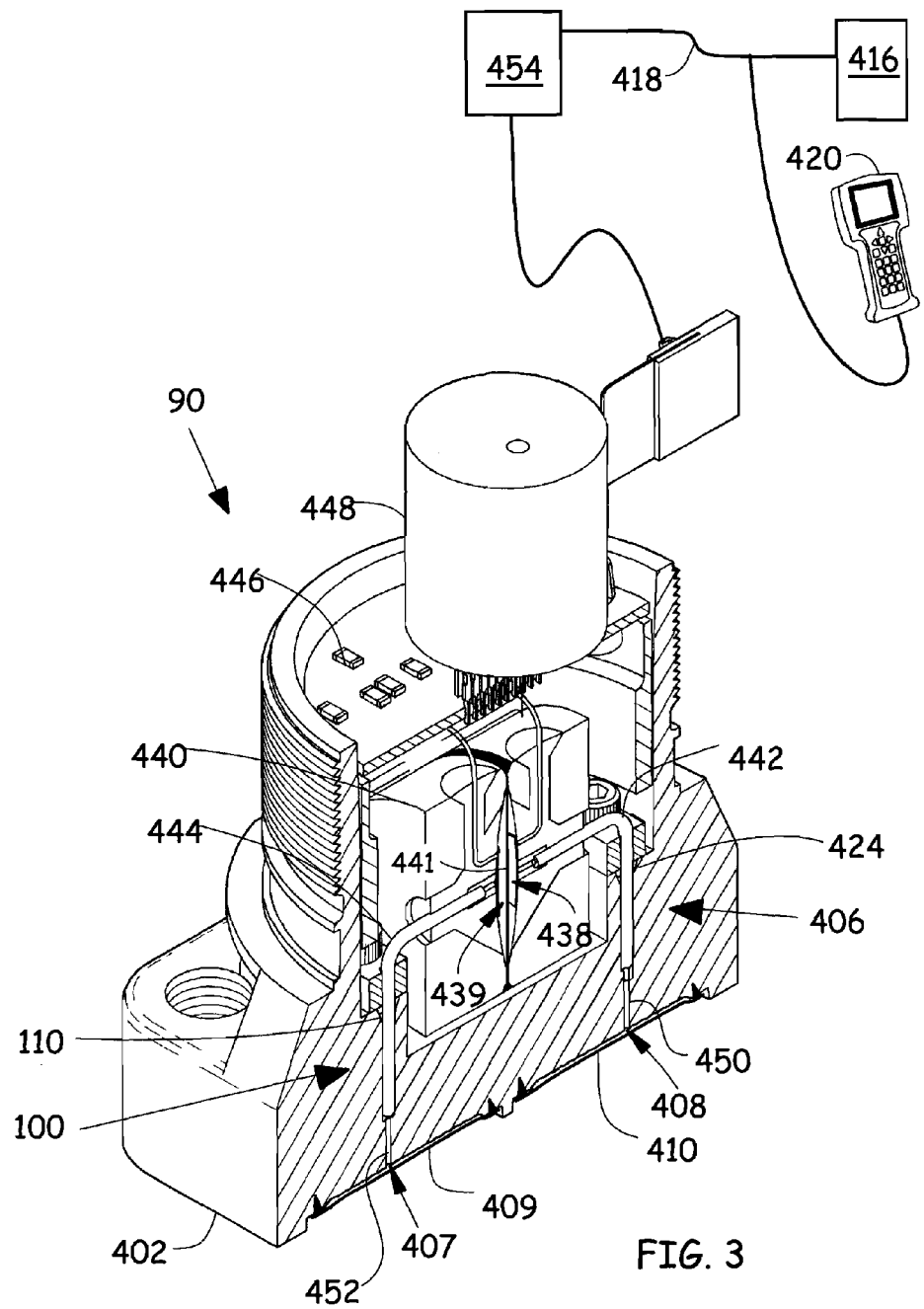
FIG. 3 illustrates a cross sectional view of a sensor module that includes a first sealed system.

FIG. 3 illustrates an embodiment of a differential pressure sensor module 90 (also called lower module 90) for use in the pressure transmitter 92 (FIG. 1). The pressure sensor module 90 includes a high pressure sealed system 100 that is filled with isolator fluid, and also a low pressure sealed system 406 that is also filled with isolation fluid. The high and low pressure sealed systems 100, 406 apply a differential pressure to a diaphragm 441 in the pressure sensor 440.

The sensor module 90 includes a module body 402 for mounting components such as the pressure sensor 440. The pressure sensor 440, as illustrated, is a differential pressure capacitive sensing cell having two internal cavities 438, 439 and capillary tubes 442, 444 that are filled with isolation fluid (as illustrated in FIG. 2A). Diaphragm 441 separates the cavities 438, 439 from one another and divides the pressure sensor 440 into "high pressure" and "low pressure" halves that have separate quantities of isolation fluid in them. The two halves of the pressure sensor 440 separately connect by the capillary tubes 442, 444 to inlets 110, 424 that are drilled openings that sealingly receive the capillary tubes 442, 444 in the module body 402.

In this embodiment, the inlets 110, 424 connect to drilled capillary passages 450, 452 which connect to fluid-filled isolator cavities 407, 408 adjacent isolator diaphragms 409, 410. Rims of the isolator diaphragms 409, 410 are welded directly to the module housing 402. The isolator diaphragm 409 and the module housing 402, taken together, comprise the first isolator diaphragm assembly 112 in FIG. 2B. An electronics circuit board 446 is electrically connected to the pressure sensor 440, and comprises electronic circuitry associated with processing electrical signals from the sensor 440. A flat cable reel 448 houses a coiled flat cable that provides electrical connections from the circuit board 446 to electronic circuitry 454 in an electronics housing (such as housing 88 shown in FIG. 1). The electronic circuitry 454 provides an output representative of pressure on line 418 to a control system 416. Preferably, a hand held calibration device 420 can be temporarily coupled to line 418 for use by a field technician in calibration, diagnostic, compensation and other operations.

The pressure sensor 440 (including capillary tubes 442, 444), is joined at inlets 110, 424 to the capillary passages 450, 452, the isolator cavities 407, 408 and the isolator diaphragms 409, 410. The capillary passages and cavities are filled with isolation fluids that separately communicate process pressures from the isolator diaphragms 409, 410 through the inlets 100, 424 to the differential pressure sensor 440. The sensing diaphragm 441 deflects in response to a difference between the separate pressures in the isolation fluids in chambers 438, 439.

The central pressure sensing diaphragm 441 provides a sealed separation of a "high pressure side" sealed system (including capillary passages 444, 452 and inlet 110 that connect the "high pressure side" isolator diaphragm 409 and a "high pressure side" of the differential pressure sensor 440). The central pressure sensing diaphragm 441 also provides a sealed separation of a "low pressure side" sealed system (including capillary passages 450, 442 and inlet 424 that connect the "low pressure side" isolator diaphragm 410 and a "low pressure side" of the differential pressure sensor 440. As the diaphragm 441 deflects, a capacitance of sensor 440 changes in a manner related to the applied pressure. The differential pressure sensor 440 thus senses a differential pressure between the high side isolator diaphragm 409 and the low pressure side isolator diaphragm 410.

The pressure sensing diaphragm 441 comprises a diaphragm that is stiff, and is typically radially stretched to increase stiffness and improve linear, non-hysteretic response to differential pressure. The pressure sensing diaphragm 441 has a thickness that is selected for a particular design pressure range of differential pressure. Only a considerable differential pressure drop across the pressure sensing diaphragm 441 can deflect the pressure sensing diaphragm over the range of diaphragm movement available in the cavities 438, 439.

The isolator diaphragms 409, 410, on the other hand, are diaphragms that are slack (compliant), and are typically corrugated to further reduce stiffness. Only a very small differential pressure drop (pressure error) across the isolator diaphragm 409, 410 can deflect the isolator diaphragms 409, 410 over the range available in the isolator cavities 407, 408. With the sealed systems 100, 406 (as described above) in the pressure sensor module 90 filled with isolation fluid, however, the stiffness of the pressure sensing diaphragm 441 is fluidly coupled to the isolator diaphragms 409, 410, and the isolator diaphragms 409, 410 have a stiff response with respect to externally applied pressure P1 from external sealed system 200 (FIG. 2B).

A sealed system 200 can be externally coupled to either the high pressure side isolator diaphragm 409 or the low pressure side isolator diaphragm 410, depending on the application. In other applications, particularly level sensing applications, one remote seal system is connected to the high side isolator diaphragm 409, and another remote seal system is connected to the low side isolator diaphragm 410.

Figure 4:
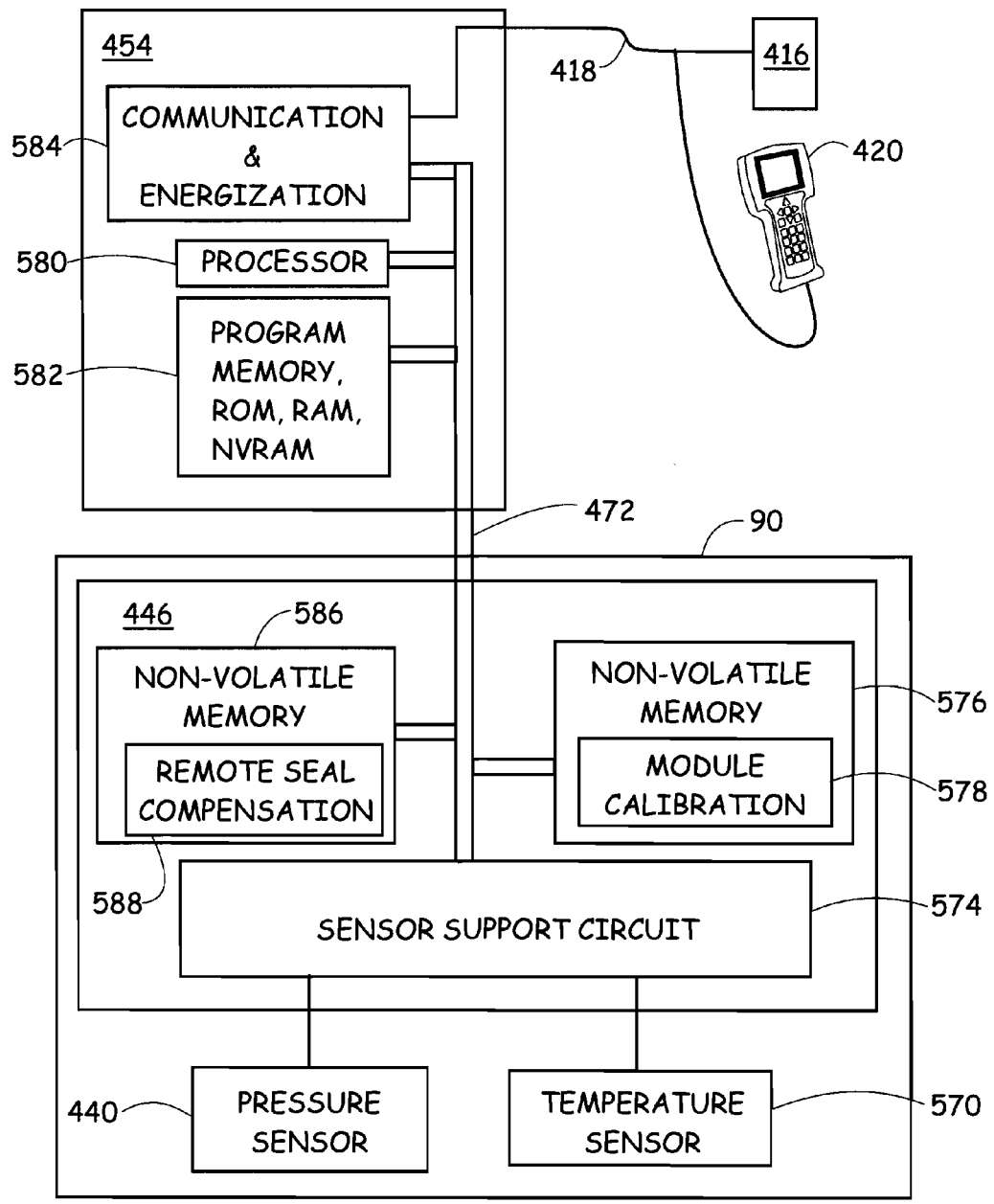
FIG. 4 illustrates a block diagram of pressure transmitter circuitry.

FIG. 4 illustrates a block diagram of the circuit board 446 shown in FIG. 3. The circuit board 446 is electrically connected to the pressure sensor 440. The circuit board 446 is electrically connected to a temperature sensor 570 mounted in the module body 402. The circuit board 446 is connected to the electronic circuitry 454 by a bus 472 that connects through the flat cable reel 448 (FIG. 3).

The circuit board 446 includes a sensor support circuit 574. The sensor support circuit 574 energizes the pressure sensor 440 and the temperature sensor 570. The sensor support circuit 574 converts analog readings from sensors 440, 570 and provides digital sensor bus signals to the bus 472. The sensor bus signals provided by sensor support circuit 574 represent uncalibrated temperature and pressure readings.

The circuit board 446 includes a first portion 576 of nonvolatile memory. The first portion 576 of nonvolatile memory stores module calibration data 578. The module calibration data 578 corrects for non-linearities in sensing pressure and for sensor errors due to temperature changes. The module calibration data 578 can be obtained during factory test and calibration of the sensor module 90, and communicated to the nonvolatile memory portion 576 through the bus 472. In operation, a processor 580 and memory 582 combine the uncalibrated temperature and pressure reading and the module calibration data 578 in order to calculate a calibrated pressure output. The calibrated pressure output is coupled via the bus 472 to a communication and energization circuit 584. The communication and energization circuit 584 provides a calibrated pressure output to the communication link 418.

According to one embodiment, the circuit board 446 includes a second portion 586 of nonvolatile memory. The second portion 586 of nonvolatile memory stores remote seal compensation data 588. The remote seal compensation data 588 corrects for pressure drop (pressure errors) due to a remote seal system that intervenes between the pressure sensor 440 and the process fluid pressure 392 (FIG. 2B). According to one embodiment, the remote seal data 588 also optionally corrects for temperatures using manually-entered temperatures of sealed systems 200, 300. The remote seal data 588 and temperatures may be entered in the field environment by an operator using the hand-held calibration device 420. The manually entered data is communicated through the communication and energization circuit 584 to the bus 472, and then from the bus 472 to the nonvolatile memory 586. In operation, the processor 580 and memory 582 (which includes program memory, ROM, RAM, and NVRAM) combine the calibrated pressure output with the remote seal compensation data 588 to provide a remote seal compensated pressure output to the communication link 418. The communication link 418 can comprise a 2 wire, 4-20 mA control loop, Foundation Fieldbus, HART®, Profibus, Industrial Ethernet, EtherNet/IP, Modbus, FDI or other known industrial communication link or protocol, including a wireless link such as WirelessHART®. (IEC 62591 Standard).

Figure 5A:
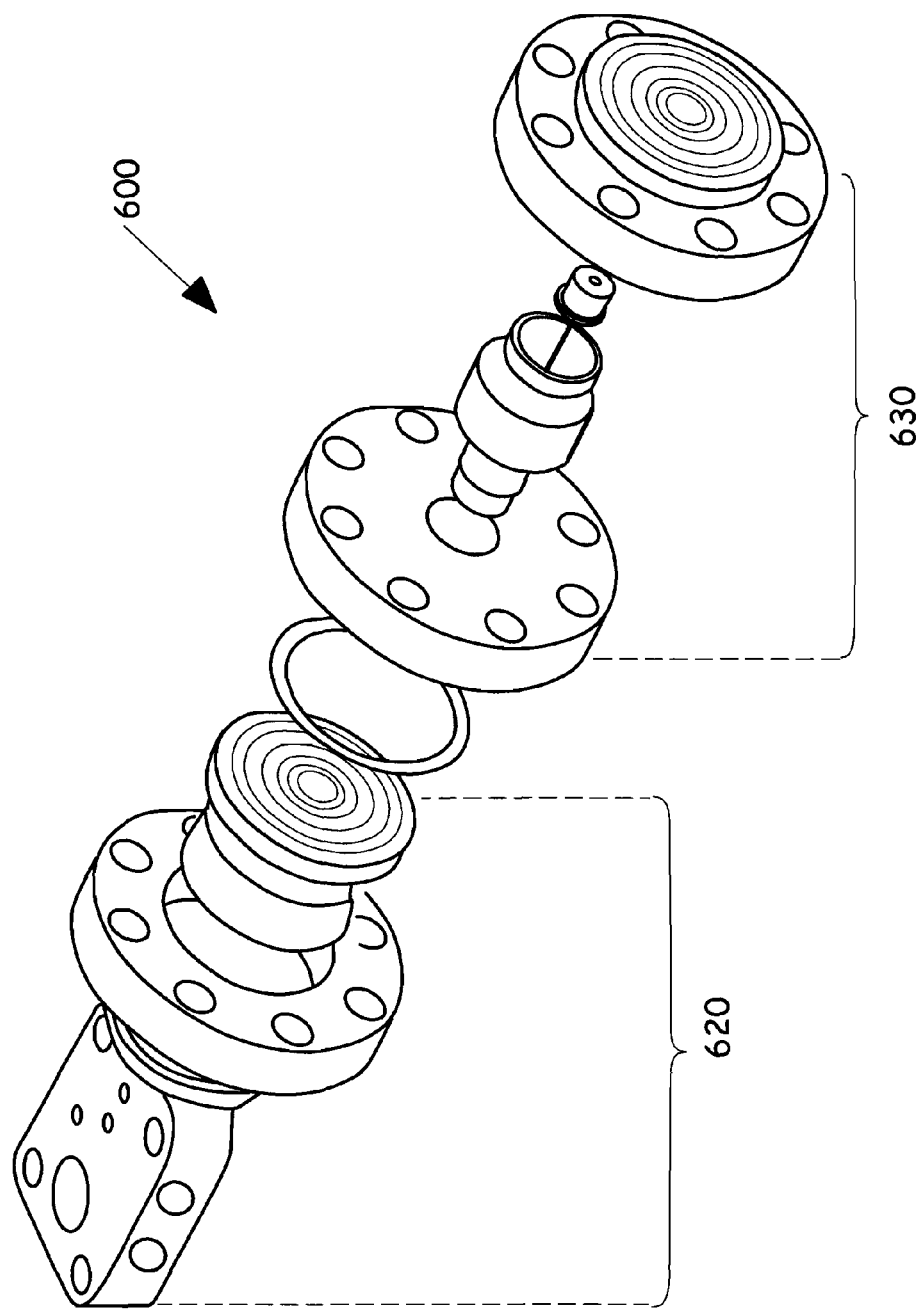

FIGS. 5A-5B illustrate a second embodiment of a process pressure measuring system 600. The process pressure measuring system 600 includes a first sealed system 610 in a pressure transmitter 612, a second sealed system 620, and a third sealed system 630. The process pressure measuring system 600 is internally configured in the same manner as shown in FIG. 2B. The first sealed system 610 and the second sealed system 620 are closely coupled to one another and are located in an environment in which the temperature may drop below 0 degrees Centigrade. The third sealed system 630 is coupled to a hot process flange (not illustrated) that is at a temperature in excess of 300 degrees Centigrade. The process measuring system 600 and the process measuring system 100 (FIG. 1) are functionally similar, and illustrate local and remote mounting options to accommodate different installation mounting requirements.

Figure 6:
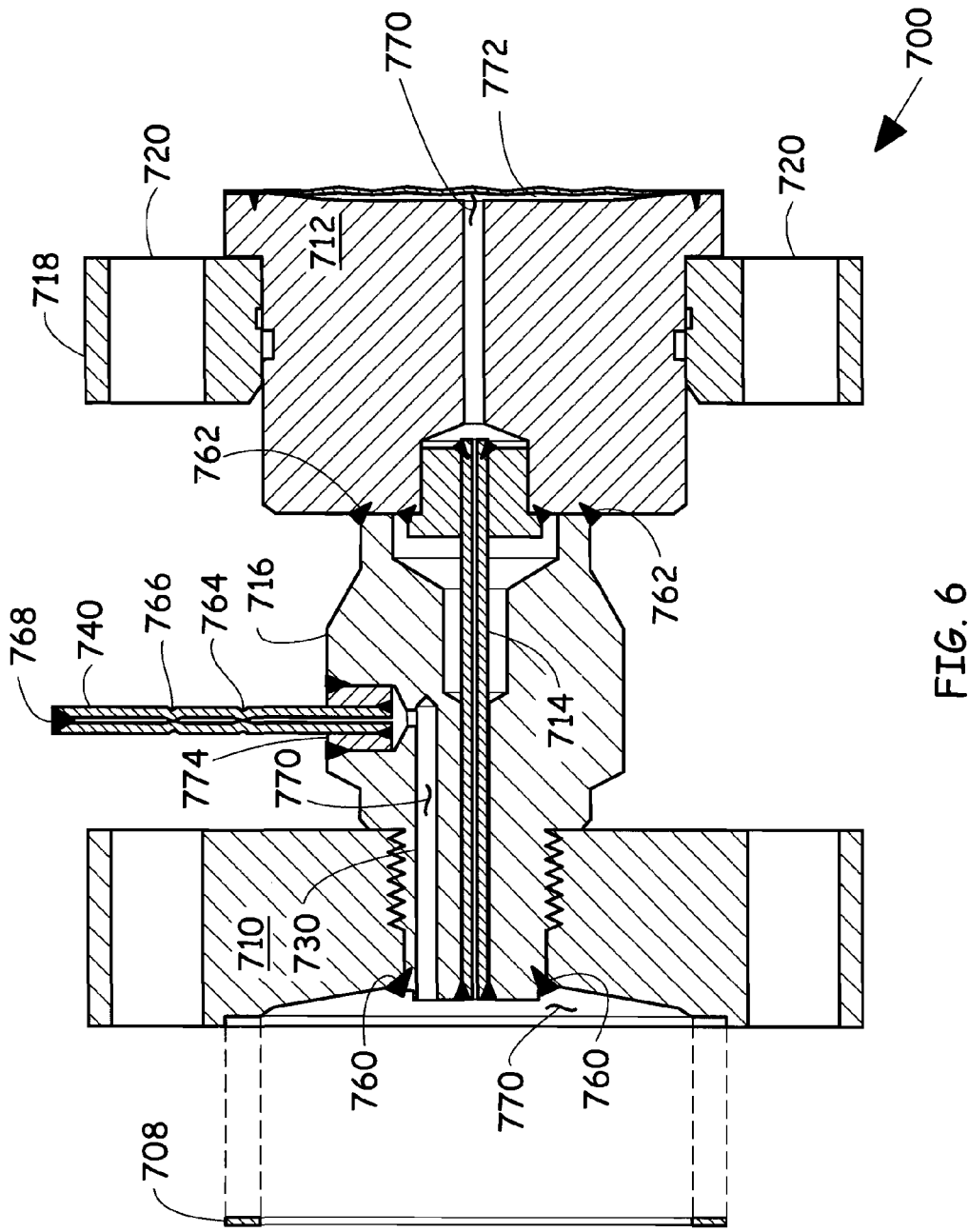
FIG. 6 illustrates a first embodiment of a third sealed system that is connectable to a process fluid.

FIG. 6 illustrates a second embodiment of a third sealed system 700, comparable to third sealed system 300 (FIG. 1). The third sealed system 700 includes a third pressure outlet 710, a third isolator diaphragm assembly 712, couplable to a high temperature source (flange 390, FIG. 2B), and a third capillary passage 714 filled with a high temperature isolator fluid that couples process pressure from the third isolator diaphragm assembly 712 through the third pressure outlet 710. The third pressure outlet 710 is open and is not covered by an isolator diaphragm. An optional washer 708 can be secured in the third pressure outlet 710, if needed, to reduce a volume of fill fluid in the third pressure outlet 710. According to one embodiment, the washer 708 serves as a gasket for sealing the third pressure outlet 710, comparable to gasket 294 in FIG. 2B.

The third sealed system comprises a support tube 716 (also called a support body) that extends between the third pressure outlet 710 and the third isolator diaphragm assembly 712. According to one embodiment, the support tube 716 is welded to the third pressure outlet 710 (at a circular weld 760) and to the third isolator diaphragm assembly 712 (at circular weld 762), and provides mechanical support and protection for the third capillary passage 714. According to one embodiment, the support tube 716 comprises a low thermal conductivity stainless steel.

The third sealed system 700 comprises a rotatable flange 718 that comprises a peripheral pattern of mounting holes 720 for mounting bolts. The rotatable flange 718 rotatably engages the third isolator diaphragm assembly 712. The flange 718 is rotatable to align the mounting bolt holes 720 with a corresponding pattern of bolt holes on the non-rotatable process vessel flange 390 (FIG. 2B) for removable attachment to a source of high temperature process fluid pressure.

The third sealed system 700 includes a capillary fill tube 740 and a bore 730 in the support tube 716 that are used for filling capillaries, passages and an isolator diaphragm chamber 772 in the third sealed system 700 with the isolation fluid 770. After filling of passages with isolation fluid 770 in the field installation environment, an outer end of the tube 740 is first sealed by crimps 764, 766 and then additionally sealed by a weld 768. Circular welds (indicated in cross section by solid triangles) throughout the third sealed system 700 are used to seal the isolator fluid within the third sealed system 700. The capillary fill tube 740 is connected to the support tube 716 by a metal plug 774 that is welded to the capillary fill tube 740 and to the support tube 716 by circular welds.

Figure 7:
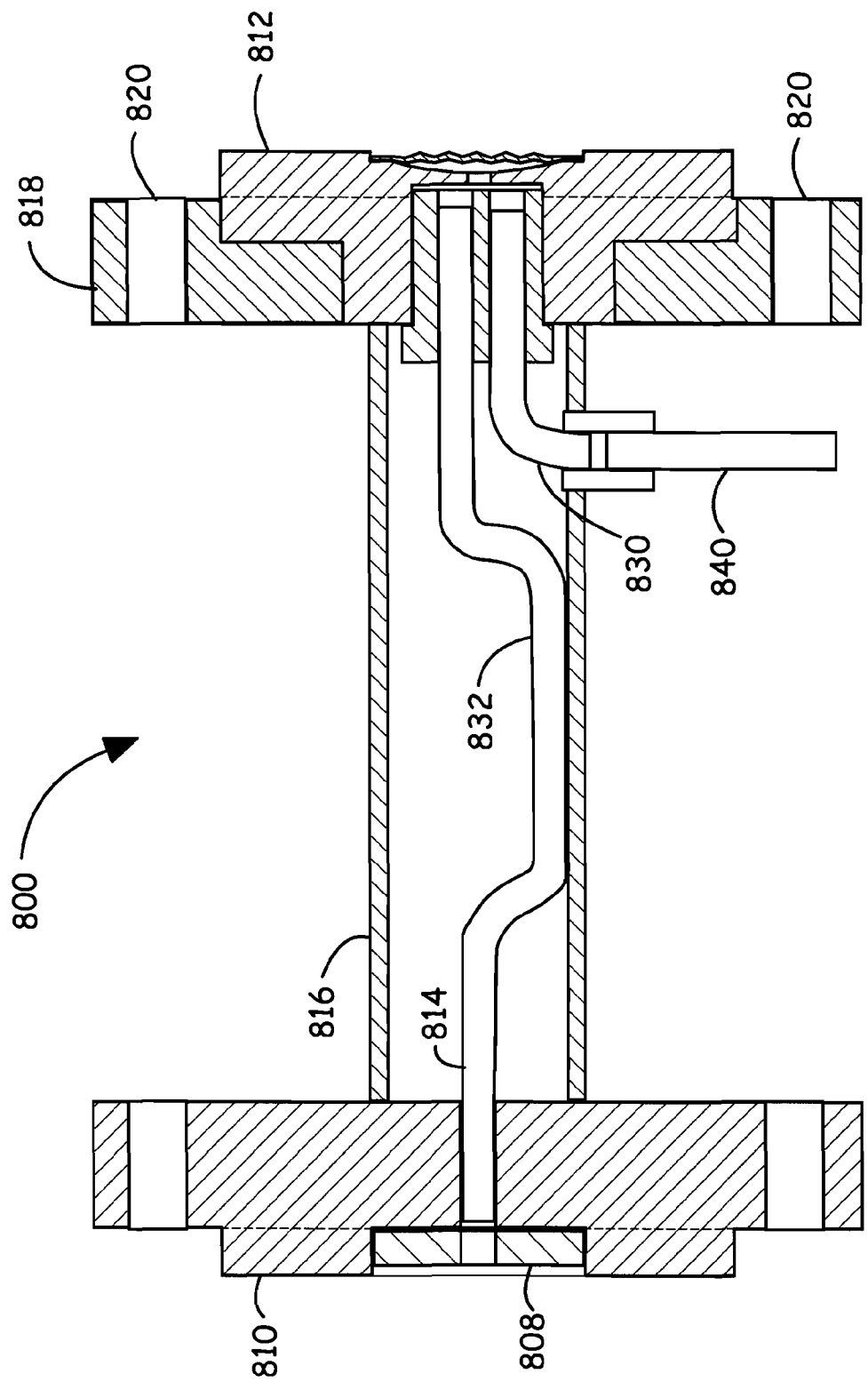
FIG. 7 illustrates a second embodiment of a third sealed system that is connectable to a process fluid.

FIG. 7 illustrates a third embodiment of a third sealed system 800. The third sealed system 800 includes a third pressure outlet 810, a third isolator diaphragm assembly 812, couplable to a high temperature source (flange 390, FIG. 2B), and a third capillary passage 814 filled with a high temperature isolator fluid that couples process pressure from the third isolator diaphragm assembly 812 through the third pressure outlet 810. The third pressure outlet 810 is open and is not covered by an isolator diaphragm. An optional washer 808 can be secured in the inlet 810, if needed, to reduce a volume of fill fluid in the inlet 810.

The third sealed system comprises a support tube 816 that extends between the third pressure outlet 810 and the third isolator diaphragm assembly 812. According to one embodiment, the support tube 816 is welded to the third pressure outlet 810 and the third isolator diaphragm assembly 812, and provides mechanical support and protection for the third capillary passage 814. The third capillary passage 814 includes a bent loop 832 that functions as a strain relief that limits tensile strain along the length of the third capillary passage 814. According to one embodiment, the support tube 816 is formed of low thermal conductivity stainless steel and is packed with thermal insulation.

The third sealed system 800 comprises a rotatable flange 818 that comprises a peripheral pattern of mounting holes 820 for mounting bolts. The rotatable flange 818 rotatably engages the third isolator diaphragm assembly 812. The flange 818 is rotatable to align the mounting bolt holes 820 with a corresponding pattern of bolt holes on the non-rotatable process vessel flange 390 (FIG. 2B) for removable attachment to a source of high temperature process fluid pressure.

The third filled system includes capillary fill tubes 830, 840 that are used for filling capillary passages with fill fluid and sealing off the capillary passage.

Figure 8:
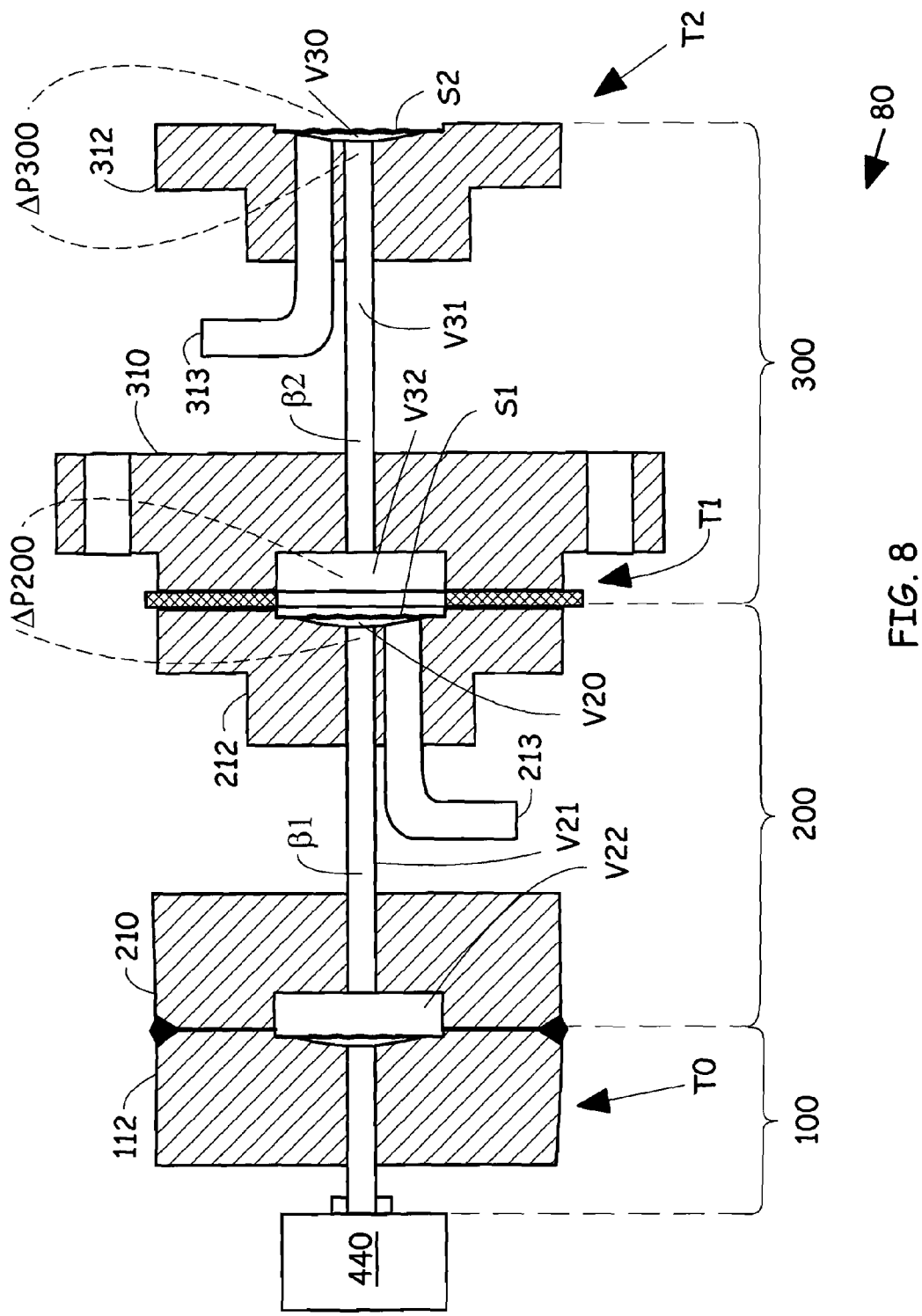
FIG. 8 illustrates pressure errors, coefficients of expansion of fill fluids, and filled volumes in a process pressure measuring system.

FIG. 8 illustrates the pressure drops (pressure inaccuracies) in the process pressure measuring system 80. The process pressure measuring system 80 includes a first sealed system 100, a second sealed system 200 and a third sealed system 300 as described above. The sealed systems 100, 200, 300 are assembled, and filled with isolation fluids with different temperature characteristics. The sealed system 100 is at a nominal temperature T0, for example 25 degrees Centigrade.

The system 200 is filled with a low temperature isolator fluid having a volumetric thermal coefficient of expansion β1. The isolator fluid in system 200 fills an isolator chamber volume V20, a capillary volume V21, and an inlet volume V22. The total volume of low temperature isolation fluid in the system 200 is the quantity (V20+V21+V22). The system 200 includes an isolator diaphragm with a stiffness S1. The stiffness S1 of the isolator diaphragm is a ratio of change of differential pressure ΔP200 to change of isolator chamber volume V20 due to isolator diaphragm deflection.

The system 300 is filled with a high temperature isolation fluid having a volumetric thermal coefficient of expansion β2. The isolation fluid in system 300 fills an isolator chamber volume V30, a capillary volume V31, and an inlet volume V32. The total volume of high temperature isolation fluid in the system 300 is the quantity (V30+V31+V32). The system 300 includes an isolator diaphragm with a stiffness S2. The stiffness S2 of the isolator diaphragm is a ratio of change of differential pressure ΔP300 to change of isolator chamber volume V30 due to isolator diaphragm deflection.

When the process pressure measuring system 80 is installed in a process environment, temperature T1 drops to less than 0 degrees Centigrade, and temperature T2 rises above 300 degrees Centigrade, resulting in pressure error ΔP due to volumetric expansion and contraction of the isolation fluids being resisted by diaphragms. The pressure inaccuracy or ΔP for the process pressure measuring system 80 is calculated according to the equation:

$$\Delta P = \Delta P200 + \Delta P300 \quad \text{Equation 1}$$

$$\Delta P200 = [(V20+V21+V22)(\beta 1)(T1-T0)](S1) \quad \text{Equation 2}$$

$$\Delta P300 = [(V20+V21+V22)(\beta 1)(T1-T0)+(V30+V31+V32)(\beta 2)(T2-T1)](S2) \quad \text{Equation 3}$$

S1 and S2 are approximated by a third order polynomial equation. According to one aspect, the third order polynomial equation is a function of T1 and T2. According to one embodiment, algorithms that calculate according to Equations 1, 2 and 3 are stored in program memory 582 (FIG. 4). Data for the calculations of Equations 1, 2 and 3 is entered into the hand-held calibrator 420 (FIG. 4) and transmitted over line 418 and bus 472 to the non-volatile memory 586 for storage as remote seal compensation data 588. In field operation, the processor 580 executes the Equation 1, 2, 3 calculations using the stored compensation data 588, and thus the transmitter provides an output representative of pressure that is corrected for the pressure inaccuracies in the sealed systems 200, 300. Inaccuracies in the sealed system 100 are similarly corrected using module calibration data 578 (FIG. 4).

While the process pressure measuring system 80 has been described with respect to one example coupling a hot process fluid to a third sealed system 300, and coupling a cold environment to a second sealed system 200, an alternative use is also contemplated in which a cold process fluid is coupled to a third sealed system 300, and a hot environment is coupled to a second sealed system 200. The process pressure measuring system 80 can be used for any temperature differential, high to low, or low to high. The fill fluid in the second sealed system 200 is different from the fill fluid in the third sealed system 300, however the fill fluid in the first sealed system need not be different from one of the fill fluids in sealed systems 200, 300.

While the process pressure measuring system has been describe with respect to one example of a high process temperature over 300 degrees Centigrade and a low ambient temperature below 0 degrees Centigrade, alternatives are also contemplated in which different high and low temperature ranges are encountered. According to one aspect, the process measuring system described above is advantageous in installations where process to ambient temperature variations are so large that use of a single type of isolation fluid would otherwise lead to poor performance.

A remote seal system with two diaphragms capable of withstanding hot process temperatures and cold ambient temperatures without the use of a heat traced capillary is disclosed. A model of second and third sealed system performance is stored in a transmitter to predict performance in the form of a compensation algorithm for correcting inaccuracies using the model. According to one aspect, connections between the first, the second and third sealed systems are made with gaskets and bolts, which allows easy repair of the remote sealed system in the field. The gasketed, bolted connections allow the second and third sealed systems and gaskets to be removed and replaced, and after replacement, to be easily filled with isolation fluid. According to another aspect, welded seals are used instead of the gaskets are, enabling use in vacuum pressure ranges, while still maintaining a certain amount of field repairability. According to still another aspect, coned-and-threaded, ferrule or tapered threaded pipe (for example, NPT threaded) connections could also be used as alternative connections.

Figure 9:
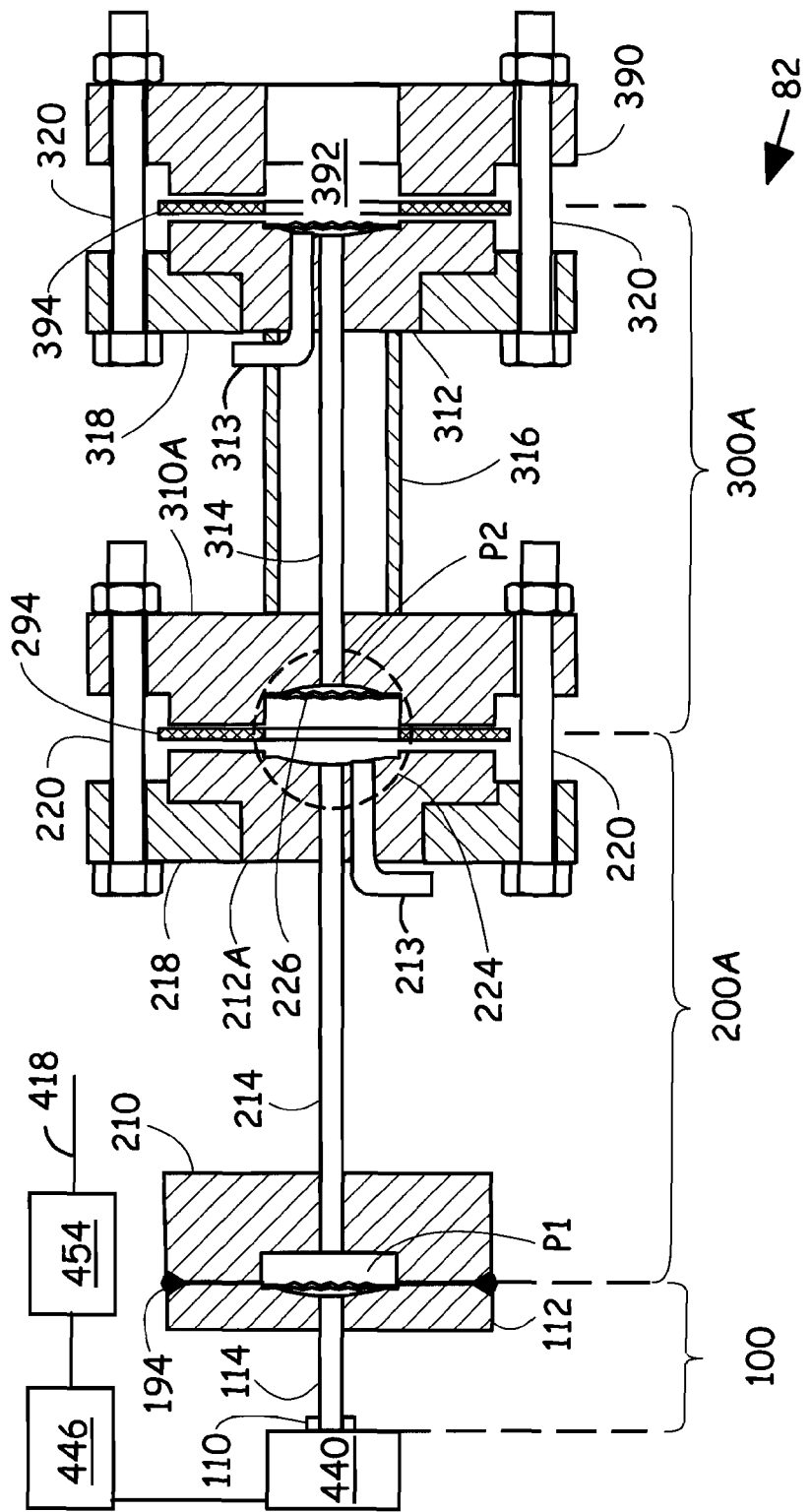
FIG. 9 illustrates a schematic cross section of an alternative process pressure measuring system.

FIG. 9 illustrates a modified process pressure measuring system 82. The modified process pressure measuring system 82 is particularly useful with process fluids such as hot molten salts in the temperature range from 220 degrees Centigrade up to 600 degrees Centigrade or liquid metals up to 1200 degrees Centigrade. The modified process pressure measuring system 82 is similar to the process pressure measuring system 80 as illustrated in FIG. 2B, however, the system 82 of FIG. 9 differs from the system 80 of FIG. 1 within the modification region indicated by circle 224 in FIG. 9. Reference numbers shown in FIG. 9 that are the same as reference numbers shown in FIG. 2B indicate the same parts except for the modifications within the region indicated by the circle 224 in FIG. 9.

In FIG. 9, the second isolator diaphragm assembly 212 is modified (within the circle 224) by removal of its isolator diaphragm and becomes a second pressure inlet 212A that is open. In FIG. 9, the third pressure outlet 310 is modified (within the circle 224) by addition of an outlet isolator diaphragm 226 and becomes an isolated third pressure outlet 310A. this arrangement (within circle 224) can be used to isolate stainless stell elements thereby allowing for the use a fill fluids that may be corrosive to stainless steel.

In FIG. 9, a process pressure measuring system 82 comprises a transmitter that comprises a first sealed system 100 having a first outlet 110 coupled to a pressure sensor 440, a first isolator diaphragm assembly 112, a first capillary passage 114, and a first isolation fluid coupling a first pressure from the first isolator diaphragm assembly 112 through the first capillary passage 114 to the first outlet 110 and the pressure sensor 440.

In FIG. 9, a second sealed system 200A has a second pressure outlet 210 that is open and fluidly coupled to the first isolator diaphragm assembly 112 and a second pressure inlet 212A that is open, a second capillary passage 214 and a second isolation fluid that is adapted for use in a first temperature range and that couples a second pressure from the second pressure inlet 212A through the second capillary passage 214 to the second pressure outlet 210.

In FIG. 9, a third sealed system 300A has an isolated third pressure outlet 310A that is closed by an outlet isolator diaphragm 226 and fluidly couplable to the second pressure inlet 212A, a third isolator diaphragm assembly 312, a third capillary passage 314 and a third isolation fluid that is adapted for use in a second temperature range, different that the first temperature range, and that couples a process pressure from the third diaphragm assembly 312 through the third capillary passage 314 to the isolated third pressure outlet 310A, whereby the process pressure couples through the third, second and first sealed systems to the pressure sensor.

Figure 10A:
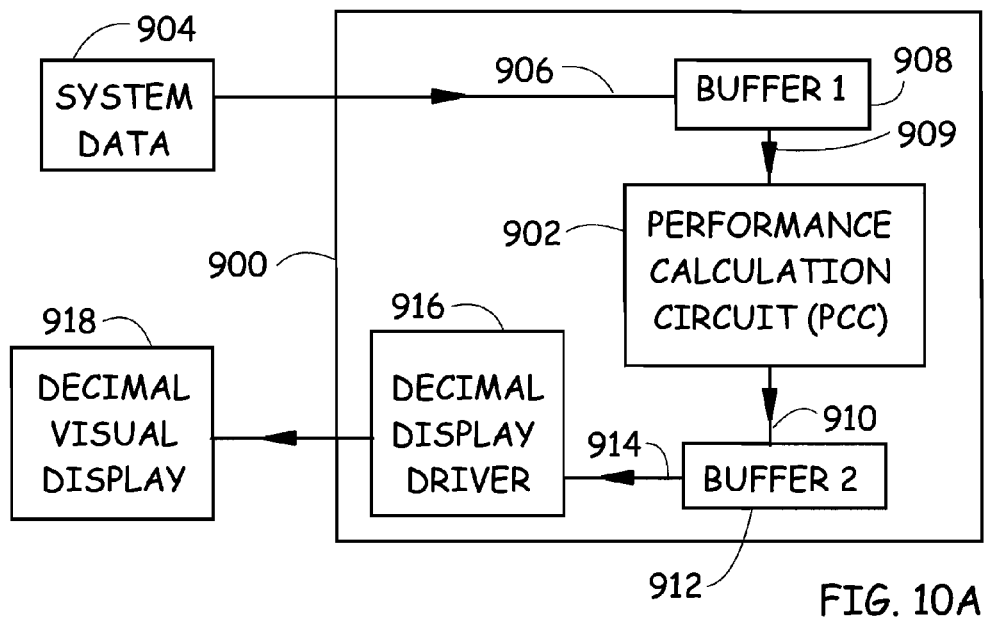
FIG. 10A illustrates a first embodiment of a circuit that provides a prediction of limits to pressure measurement errors.

FIG. 10A illustrates a circuit 900 that provides a prediction of limits to pressure measurement errors due use of second and third sealed systems 200 and 300 (FIG. 2B). In one embodiment, the limits are calculated for a particular installation pressure and temperature environment, and for a particular configuration of sealed systems 200 and 300, including selection of isolation fluids.

According to one aspect, the circuit 900 does not include a microprocessor, and is packaged as a handheld device that can be used in a field application environment by a technician. The circuit 900 includes a performance calculation circuit (PCC) 902 that executes calculations based on Equations 1, 2, and 3. According to one aspect, the circuit 902 comprises one or more gate arrays that have connections selected to calculate Equations 1, 2, and 3 multiple times for multiple limits of pressure and temperature. According to another aspect, the circuit 902 comprises one or more custom integrated circuits that calculate Equations 1, 2, and 3 multiple times for multiple limits of pressure and temperature.

System data 904 is provided along line 906 to a first data storage device 908. According to one aspect, the system data 904 is provided to the circuit 900 by a computing device (not illustrated in FIG. 10A) such as a desktop computer, a laptop computer, a tablet computer, or a mobile phone. According to another aspect, the line 906 comprises a universal serial bus (USB). According to another aspect, the line 906 comprises a Firewire bus. According to another aspect, the line 906 comprises an ethernet connection. According to another aspect, line 906 comprises a wireless connection. According to one aspect, system data 904 includes upper and lower installation pressure limit data, upper and lower installation temperature limit data, isolation fluid expansion data and stiffness data for isolator diaphragms.

System data stored (buffered) in the first storage device 908 is coupled along line 909 to the performance calculation circuit 902. Performance calculation circuit 902 calculates performance (error limits for pressure measurements) based on system data received from the first storage device 908. Performance calculation circuit 902 provides calculated upper and lower error limits on line 910 to second data storage device 912. Second data storage device 912 provides stored data on line 914 to a decimal display driver circuit 916. The decimal display driver circuit 916 drives a decimal visual display 918 which displays performance error limits. The user views the performance error limits, and makes a decision, based on the error limits, to proceed with use of the sealed systems 200 and 300, or to make adaptation if needed, such as selection of different isolation fluids.

According to one aspect, the decimal visual display 918 is included in the circuit 900. According to another aspect, the decimal visual display is external and is connectable to the circuit 900. According to one aspect, the visual display 918 comprises a display screen. According to another aspect, the visual display 918 comprises a display projector which projects a display on a projection screen or at a user's eye.

Figure 10B:
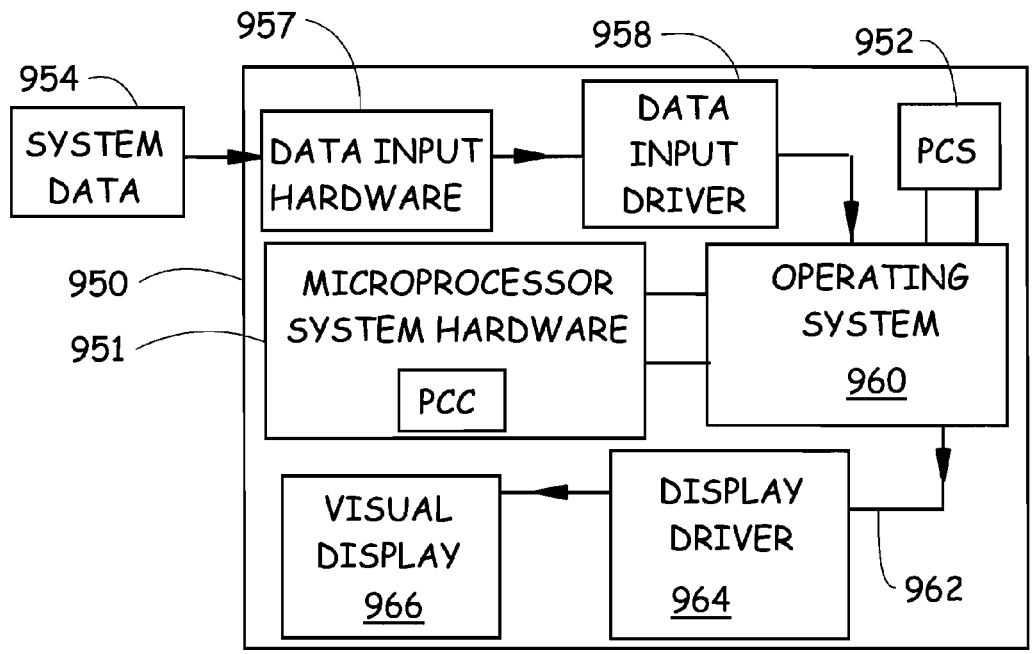
FIG. 10B illustrates a second embodiment of a circuit that provides a prediction of limits to pressure measurement errors.

FIG. 10B illustrates a circuit 950 that provides a prediction of limits to pressure measurement errors or inaccuracies due use of second and third sealed systems 200 and 300 (FIG. 2B). In one embodiment, the limits are computed for a particular installation pressure and temperature environment, and for a particular configuration of sealed systems 200 and 300, including selection of isolation fluids. According to one aspect, the circuit 950 comprises a desktop computer, a laptop computer, a tablet computer, or a mobile phone.

The circuit 950 includes a microprocessor system 951. The microprocessor system 951 comprises a microprocessor, RAM, ROM, clock circuit, bus circuits, and interface circuits. The RAM portion of the microprocessor system 951, when loaded with performance computation software (PCS) 952, functions as a performance calculation circuit (PCC) and performs calculations of multiple error limits. The circuit 950 includes performance computation software (PCS) 952 that includes algorithms based on Equations 1, 2, and 3 that are executable to execute Equations 1, 2, and 3 multiple times with upper and lower limits of temperature and pressure to calculate multiple error limits that define performance error limits.

System data 954 is provided to input hardware 957, which is in turn connected to data input driver 958. According to one aspect, the input hardware 957 comprises a keyboard and a pointing device, such as a mouse. According to another aspect, the input hardware 957 comprises a touchpad. According to another aspect, the input hardware 957 comprises a wireless device. According to one aspect, system data 954 includes installation pressure limit data, installation temperature limit data, isolation fluid expansion data, and stiffness data for isolator diaphragms.

The microprocessor system 951 executes the performance computation software 952 to calculate performance (error limits for pressure measurements) based on the system data 954. An operating system 960 retrieves results from the microprocessor system 951 and provides calculated limits on line 962 to a display driver 964. The display driver 964 provides data to display 966 that is readable by the user. Display 966 can be any known type of computer display device. The user views the performance limits, and makes a decision, based on the limits, to proceed with use of the sealed systems 200 and 300, or to make adaptation if needed, such as selection of different isolation fluids.

According to one aspect, the performance computation software 952 comprises a compiled program that is executable by the operating system 960. According to another aspect, the performance computation software 952 comprises java code, and the operating system invokes a java interpreter to provide executable code based on the java code to the operating system 960. According to another aspect, the performance computation software comprises C# (C Sharp) code. According to another aspect, the performance computation software runs in a .NET computing environment in the operating system. According to another aspect, the performance computation software 952 is provided to the circuit 950 by a server (not illustrated).

Although the present invention has been described with reference to preferred embodiments, workers skilled in the art will recognize that changes may be made in form and detail without departing from the spirit and scope of the invention.

What is claimed is:

1. A process pressure measuring system, comprising:
    a first sealed system that includes a first pressure outlet, a pressure sensor, a first isolator diaphragm assembly and a first capillary passage filled with a first isolation fluid that couples a process pressure from the first isolator diaphragm assembly through the first capillary passage and the first pressure outlet to the pressure sensor;
    a second sealed system removably mounted to the first sealed system and that includes a second open pressure outlet, a second isolator diaphragm assembly and a second capillary passage filled with a second isolation fluid for use in a first temperature range, the second isolation fluid coupling the process pressure from the second isolator diaphragm assembly through the second capillary passage and the second open pressure outlet to the first isolator diaphragm assembly and including a first fill tube coupled to the second capillary passage, the first fill tube used to fill the second capillary passage with the second isolation fluid;
    a third sealed system removably mounted to the second sealed system and that includes a third pressure outlet, a third isolator diaphragm assembly, couplable to a source of the process pressure in a second temperature range, different than the first temperature range, and a third capillary passage filled with a second isolation fluid, different than the first isolation fluid, that couples the process pressure from the third isolator diaphragm assembly through the third capillary passage and the third pressure outlet to the second isolator diaphragm assembly and including a second fill tube coupled to the third capillary passage, the second fill tube used to fill the third capillary passage with the third isolation fluid; and
    the process pressure coupling through the third, second and first sealed systems to the sensor, and the use of isolation fluids with different temperature ranges reducing inaccuracies in a sensed pressure at the pressure sensor.

2. The process pressure measuring system of claim 1 wherein the first sealed system comprises a transmitter.

3. The process pressure measuring system of claim 2, wherein the use of second and third isolation fluids with different temperature ranges reduces inaccuracies in a sensed pressure output of the transmitter.

4. The process pressure measuring system of claim 2, further comprising:
    a flange that engages the third isolator diaphragm assembly, and that is rotatable to align with process vessel mounting holes for field-removable coupling to the process fluid.

5. The process pressure measuring system of claim 2 wherein the second isolation fluid comprises a fill fluid that is free flowing below a first temperature.

6. The process pressure measuring system of claim 5 wherein the first temperature is 0 degrees Centigrade.

7. The process pressure measuring system of claim 2 wherein the third isolation fluid comprises a fill fluid that does not vaporize below a second temperature.

8. The process pressure measuring system of claim 7 wherein the second temperature is 350 degrees Centigrade.

9. The process pressure measuring system of claim 2 wherein the second isolator assembly introduces a second pressure drop, and the second pressure drop is corrected by a compensation algorithm in the pressure transmitter.

10. The process pressure measuring system of claim 2 wherein the third isolator assembly introduces a third pressure drop, and the third pressure drop is corrected by a compensation algorithm in the pressure transmitter.

11. The process pressure measuring system of claim 1, further comprising:
    a flange that engages the third isolator diaphragm assembly, and that is rotatable to align with process vessel mounting holes for field-removable coupling to the process fluid.

12. The process pressure measuring system of claim 1 wherein the second isolation fluid comprises a fill fluid that is free flowing below a first temperature.

13. The process pressure measuring system of claim 1 wherein the second isolation fluid comprises a fill fluid that does not vaporize at a temperature below a second temperature.

14. The process pressure measuring system of claim 1 wherein the second isolator assembly introduces a dynamic pressure loss that is controllable by the selection of the second isolation fluid.

15. The process pressure measuring system of claim 1 wherein the third isolator assembly includes a support tube that couples between the third isolator assembly and the third pressure outlet.

16. A circuit, comprising:
    a performance calculation circuit that calculates multiple error limits related to a remote seal system comprising the first, second and third sealed systems of claim 1 as a function of system data related to the remote seal system, and that provides multiple error limit data;
    an input circuit that receives the system data and that provides the system data to the performance computation circuit; and
    a display driver circuit that receives the error limit data and that provides a display driver output that includes the error limit data presented in a visual display format.

17. The circuit of claim 16 wherein the performance calculation circuit includes a gate array.

18. The circuit of claim 16 wherein the performance calculation circuit includes a custom integrated circuit that performs error limit calculation.

19. The circuit of claim 16 wherein the performance calculation circuit includes a microprocessor system that performs the error limit calculation under control of a computer operating system.

20. A method for coupling to a first sealed system and a pressure sensor in a pressure transmitter to a dual temperature remote seal system, the method comprising:

removably mounting a second sealed system to the first sealed system, the second sealed system having a second pressure outlet that is open and fluidly couplable to the first sealed system, a second isolator diaphragm assembly, a second capillary passage, and a second isolation fluid, for use in a first temperature range, the second isolation fluid coupling pressure from the second isolator diaphragm assembly through the second capillary passage to the second pressure outlet;

filling the second capillary passage with the second isolation fluid through a first fill tube which couples to the second capillary passage;

sealing the first fill tube;

removably mounting a third sealed system to the second sealed system, the third sealed system having a third pressure outlet that is open and fluidly couplable to the second isolator diaphragm assembly, a third isolator diaphragm assembly, a third capillary passage, and a third isolation fluid, for use in a second temperature range, the third isolation fluid coupling pressure from the third isolator diaphragm assembly through the third capillary passage to the third pressure outlet;

filling the third capillary passage with the third isolation fluid through a second fill tube which couples to the third capillary passage;

sealing the second fill tube; and coupling a process pressure through the third, second and first sealed systems to the pressure sensor, the use of second and third isolation fluids with different temperature ranges reducing inaccuracies in a sensed pressure at the pressure sensor.

21. The method of claim 20, further comprising:

providing a flange that engages the third isolator diaphragm assembly, and that is rotatable to align with process vessel mounting holes for field-removable coupling to the process fluid.

22. The method of claim 20 including selecting the second isolation fluid to be free flowing below 0 degrees Centigrade.

23. The method of claim 20 including selecting the third isolation fluid to be a non-vaporizable fluid at a temperature below 350 degrees Centigrade.

24. The method of claim 20 including controlling a dynamic pressure loss in the second isolator assembly by the selection of the second isolation fluid.

* * * * *